US011678385B2

(12) United States Patent
Rueckert

(10) Patent No.: US 11,678,385 B2
(45) Date of Patent: *Jun. 13, 2023

(54) METHOD FOR LOGGING A TARGET DEVICE INTO A NETWORK

(71) Applicant: Tobias Rueckert, Winterbach (DE)

(72) Inventor: Tobias Rueckert, Winterbach (DE)

( * ) Notice: Subject to any disclaimer, the term of this patent is extended or adjusted under 35 U.S.C. 154(b) by 365 days.

This patent is subject to a terminal disclaimer.

(21) Appl. No.: 17/136,118

(22) Filed: Dec. 29, 2020

(65) Prior Publication Data

US 2021/0120597 A1    Apr. 22, 2021

Related U.S. Application Data

(63) Continuation-in-part of application No. PCT/EP2019/065790, filed on Jun. 16, 2019.

(30) Foreign Application Priority Data

Jul. 8, 2018  (DE) ..................... 10 2018 116 500.5

(51) Int. Cl.
*H04B 10/00* (2013.01)
*H04W 76/10* (2018.01)
(Continued)

(52) U.S. Cl.
CPC .......... *H04W 76/10* (2018.02); *H04B 10/116* (2013.01); *H04W 12/068* (2021.01); *H04W 60/00* (2013.01); *H04W 84/12* (2013.01)

(58) Field of Classification Search
CPC . H04B 10/116; H04B 10/112; H04B 10/1123; H04B 10/1125; H04B 10/1127;
(Continued)

(56) References Cited

U.S. PATENT DOCUMENTS 9,749,844 B1   8/2017  Sovani et al.
11,558,844 B2 * 1/2023 Rueckert ............... H04W 60/00
(Continued)

FOREIGN PATENT DOCUMENTS

DE   10 2016 014 478 A1   6/2018
DE   10 2016 014 479 A1   6/2018

OTHER PUBLICATIONS

Search Report of the German Patent Office for a corresponding German Patent Application No. 10 2018 116 500.5, dated Apr. 15, 2019 to which the present application claims priority benefit.
(Continued)

*Primary Examiner* — Hanh Phan
(74) *Attorney, Agent, or Firm* — Ronald S. Lombard

(57) ABSTRACT

A method for logging a target device onto a network comprising: transmitting an electronic log-on message from a terminal device to a universal communication platform by a user, the log-on message contains information about the identity of the target device and a log-on option to said network, and where at the time of transmission of the message, there is no communication link between the terminal device and the target device; integrating the log-on message into a log-on credentials message by the universal communication platform; transmitting the log-on credentials message from the universal communication platform to the user's terminal device; transmitting the information contained in the log-on credentials message as modulated light by the terminal device, acquiring said information through a light-sensitive sensor of the target device and extracting the information about the option to log onto said network, logging onto the network using the log-on option by the target device.

10 Claims, 1 Drawing Sheet

(51) Int. Cl.
  *H04W 12/06* (2021.01)
  *H04B 10/116* (2013.01)
  *H04W 60/00* (2009.01)
  *H04W 84/12* (2009.01)

(58) Field of Classification Search
  CPC .............. H04B 10/1129; H04B 10/114; H04B 10/1143; H04B 10/1149; H04B 10/40; H04W 76/10; H04W 60/00; H04W 12/068
  USPC ....... 398/118, 119, 127, 128, 129, 130, 131, 398/172, 135, 136, 158, 159, 115, 182, 398/183, 202, 208, 209
  See application file for complete search history.

(56) References Cited

U.S. PATENT DOCUMENTS

| | | |
|---|---|---|
| 2014/0057676 A1 | 2/2014 | Lord et al. |
| 2014/0363168 A1* | 12/2014 | Walker ................. H04B 10/116 398/115 |
| 2015/0195036 A1* | 7/2015 | Park ..................... H04W 48/16 398/118 |
| 2015/0317467 A1 | 11/2015 | Rattner et al. |
| 2016/0021635 A1 | 1/2016 | Lee et al. |
| 2017/0142086 A1 | 5/2017 | Chen et al. |
| 2017/0196318 A1 | 7/2017 | Liu et al. |
| 2017/0268824 A1 | 9/2017 | Shin |
| 2018/0159354 A1 | 6/2018 | Garcia-Marquez et al. |

OTHER PUBLICATIONS

Goggle generated English translation of the substantive portion of the German Patent Office Search Report for the corresponding German Patent Application No. 10 2018 116 500.5, 2018.

The International Search Report for the corresponding international application No. PCT/EP2019/065790, dated Sep. 6, 2019 in the German language (2 pages).

The English translation of the International Search Report for the corresponding international application No. PCT/EP2019/065790 (2 pages), 2019.

* cited by examiner

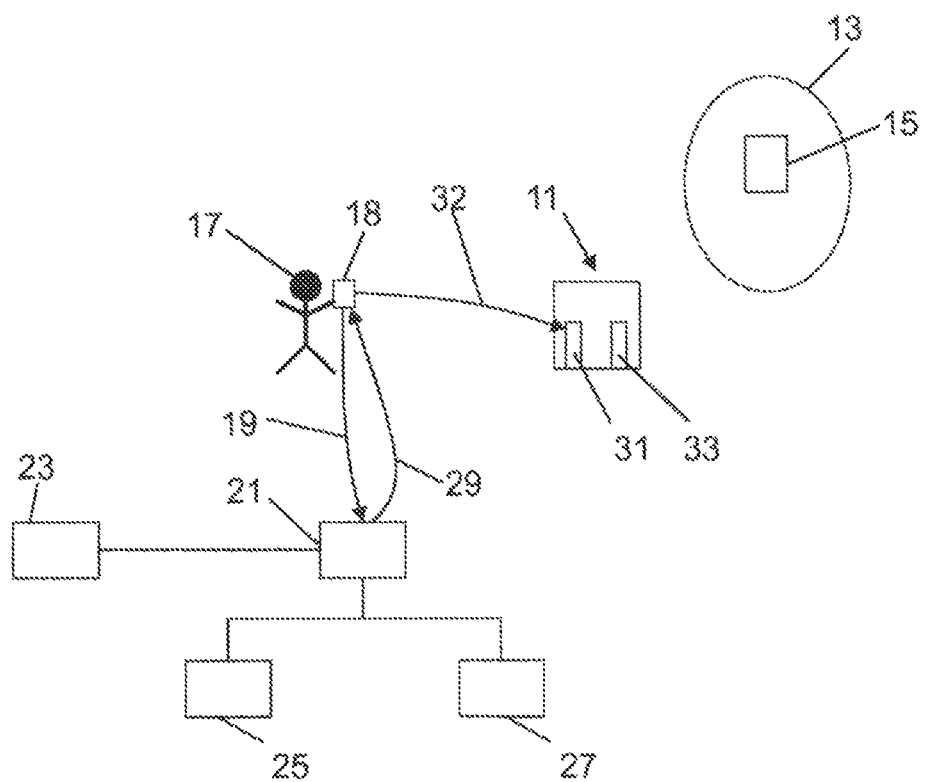

METHOD FOR LOGGING A TARGET DEVICE INTO A NETWORK

CROSS-REFERENCE TO RELATED APPLICATION

This is a continuation-in-part application of pending international application PCT/EP2019/065790 filed Jun. 16, 2019 and claiming the priority of German Application No. 10 2018 116 500.5 filed Jul. 8, 2018. The aforesaid pending international application PCT/EP2019/065790 and German Application No. 10 2018 116 500.5 are both incorporated herein by reference in their entireties as though fully set forth.

BACKGROUND OF THE INVENTION

The invention relates to a method for registering a target device with a network with the features of the claims.

Many electronic devices for industrial, commercial and private use have an interface that allows information, such as status information or measured values, to be read out or to control the device, e.g. to activate it, to deactivate it or to configure it. Examples are weather stations that measure temperature and air quality in the private sector, surveillance cameras, air conditioning systems, TV sets, heating controls, refrigerators and in the industrial sector processing machines or access systems. Such electronic devices are referred to as target devices in the following text. The connection with the corresponding device can usually be established by means of special programs on a computer, a tablet computer, a smartphone, a so-called wearable device or another electronic device that can execute programs or apps. These electronic devices are referred to as terminal devices in the following text. In order to establish the aforementioned connection, for example, a coupling process via a wireless connection, especially the Internet, is necessary. For this purpose, the target device must be registered in a network, for example in a WLAN network. The log-on of the target device to a network, e.g. to a password-protected WLAN, can be quite complex and cumbersome, especially since the target devices often do not offer a keyboard.

In this context, the task of the invention is in particular to propose a method for logging a target device into a network which is easy to perform.

SUMMARY OF THE INVENTION

According to the invention, this task is solved by a procedure with the features of the claims.

The method for logging a target device into a network according to this invention comprises at least the following steps, which are in particular carried out in the specified order:

transmitting an electronic log-on message from a terminal device to a universal communication platform by a user, wherein the registration message contains information about the identity of the target device and a logon possibility to said network, and wherein at the time of transmission of the electronic log-on message, there is no communication connection between the terminal device and the target device present;

integration of the aforementioned information of the log-on message into a logon credentials message by the universal communication platform;

sending the aforementioned log-on credentials message from the universal communication platform to the user's terminal device;

transmitting the information contained in the log-on credentials message by the user's aforementioned terminal device in the form of modulated light;

capturing said information through a light-sensitive sensor of the target device and extracting the logon credentials for said network; and logging the target device into the network by using the mentioned logon possibility.

The term "logging a target device into a network" is to be understood as enabling a communication connection between the target device and other participants in the mentioned network. A "communication connection" here means that electronic devices can exchange data, e.g. exchanging electronic messages. In particular, the network is at least partially wireless, which means it is, for example, a WLAN, a Bluetooth or a so-called Long Range Wide Area network. In particular, the network is connected to the Internet, so that after the target device has logged into the network, there is a connection between the target device and the Internet present. After the target device is registered in the network, communication between a user's terminal device and the target device is possible. The mentioned terminal device can also be connected with the network. However, it is also possible that the terminal device communicates with a so-called universal communication platform, which in turn communicates with the target device via the Internet and/or the network. A target device necessarily needs to be registered in a network the first time, for example, after the purchase of the target device, i.e. during a so-called initial startup.

To register the target device, the user first sends an electronic log-on message to a universal communication platform. For this purpose, the universal communication platform has at least one so-called receiving address where the user can address the electronic message to the universal communication platform. A receiving address can be, for example, an e-mail address, a mobile phone number, a WhatsApp® or Facebook® account or similar. In this context, a universal communication platform is understood to be an electronic device or a service running on a server on the Internet that enables communication between the user's terminal device and the target device. In the simplest case, the universal communication platform is designed as a router of a WLAN network. The log-on message can be in a special, predefined format or as free text. In particular, the log-on message can take the form of a text. However, it is also possible that the registration message consists at least partially of a voice message and/or contains images, for example the image of a WLAN router with a printed access code.

In particular, the user uses a communication channel through which the user can also communicate with other users for the log-on message, for example through a so-called short message service, such as SMS, Twitter®, WhatsApp® or e-mail or through messages in a social network such as Facebook® or a special, specifically-secured messenger or chat app. It is also conceivable that communication takes place via a so-called "Voice Activated Assistant", such as Siri®, Alexa®, Echo® or Google Home®. To make this possible, the universal communication platform is designed to receive and interpret the user's log-on message transmitted via one of the communication channels mentioned above. The electronic log-on message may also take the form of an entry made by the user on an Internet page provided by the universal communication platform, which the user has opened on the terminal device. In this case, the receiving address of the universal communication platform is the address of the said Internet page.

The electronic log-on message contains information about the identity of the target device and a login option to the named network. The target device identity information may include, for example, a serial number and optionally the target device manufacturer. For example, the target device may have a QR code attached to it, which contains the information about the identity of the target device and can be easily read by a camera on the user's terminal device. The information about the identity of the target device may also be contained in written documents, such as a warranty certificate.

A QR code is a two-dimensional code that contains information, especially in the form of text. A QR code consists of a square matrix of black and white squares that represent the encoded data in binary form. A special marking in three of the four corners of the square indicates the orientation of the QR Code. There are a number of so-called apps for mobile devices available, which can be used to read QR codes via a camera. It is also conceivable that no special app needs to be used to read QR codes, but the "normal" camera app is designed to automatically recognize, read and convert QR codes.

The information about a login to the network can include, for example, a password and optionally the name of the network that takes the form of a WLAN network. This information can also be provided in other ways that are deemed useful by a specialist of the field.

At the time of sending the electronic log-on message, there is no communication link between the terminal device and the target device present. In particular, a communication link only exists only after the target device has logged onto the network. The terminal device is therefore not used by the target device to send the logon message, but the process of sending of the logon message is initiated and started by the user on the terminal device. The reading of a QR code on the target device is not to be considered as a communication connection, because although information flows from the target device to the terminal device, information cannot be transmitted from the terminal device to the target device. Thus, no electronic communication with the target device is necessary before sending the electronic log-on message. Such electronic communication would also have to be established in some way. This would require additional effort, especially if an encrypted and thus secure connection with the target device is to be established.

In particular, the electronic log-on message is transmitted in encrypted form from the user's terminal device to the universal communication platform. Various encryption methods are possible, such as AES (Advanced Encryption Standard) encryption.

The universal communication platform first interprets the received log-on message. For this purpose, it searches the log-on message for certain keywords such as "login" or "onboarding". If it recognizes one of these keywords, it extracts the above-mentioned information about the identity of the target device and the possibility to log onto the mentioned network. It can also search for keywords such as "serial number" or "password" and extract this information from the log-on message. To interpret the log-on message, the universal communication platform can also access a so-called knowledge database. In this context, a knowledge database is understood to be a semantic database or a so-called Natural Language Processing Library. Such knowledge databases are made available on the Internet by providers whose services can be used, for example, for a user fee. Examples of such a knowledge database are "Watson" from IBM® and "Dialogflow" from Google®.

When the log-on message is entered by the user via an Internet page provided by the universal communication platform, the information is entered into predefined fields so that it can be extracted very easily.

After extracting the aforementioned information from the logon message, the universal communication platform generates a logon credentials message and integrates the information about the identity of the target device and the possibility to log on to the aforementioned network into the log-on credentials message. The information is contained in the log-on credentials message in a specified format and syntax.

The universal communication platform sends the aforementioned log-on credentials message to the user's terminal device. In particular, the log-on credentials message is also sent encrypted to the terminal device. For this purpose, the universal communication platform can, for example, use the same communication channel over which the user sent the log-on message. However, it is also possible that a different communication channel is used.

The user's terminal device emits the log-on credentials message in the form of modulated light. "Modulated light" is to be understood as light with changing characteristics. The said change of the light characteristics allows to transfer information or data. In particular, the intensity or brightness of the light is purposefully changed, so that the light "flickers". This flickering can be performed in such a way that it cannot be perceived by the human eye. It is also conceivable that the color of the light is changed and the information is transmitted by this color modulation.

The terminal device uses a built-in flashlight device to send out the information, that is otherwise normally used for better illumination when taking pictures, or as a flashlight. The flashlight device has in particular a LED that can produce modulated light. The transmission can also be done by a separate transmission device, especially with one or more LEDs, which is controlled by the terminal device.

The transmission is performed in particular in the vicinity of the target device so that a light-sensitive sensor of the target device, in particular in the form of a photo sensor, can detect the transmitted modulated light, i.e. the content of the log-on credentials message. The target device extracts the login information for the mentioned network, for example the password for the network running as a protected WLAN network. The algorithms required for the extraction are programmed into the target device. It is also possible that the algorithms are updated after the connection to the Internet. In particular, the target device is designed in such a way that it only extracts or evaluates the contents of the received log-on credentials message completely if it recognizes that the information is intended for the target device. To do this, it can first extract the information about the identity of the target device. If the identity of the target device in the credential message matches its own identity, it will also extract the information about the possibility to log on to the network.

Finally, the target device logs onto the network with the information about the logon option, for example with the information about the name of the WLAN network and the password. The target device is thus logged onto the network and can send data or information and receive commands via the network. The user can thus communicate directly via a terminal device or via the individual communication platform.

Communication between a user with a terminal device and a target device is understood here to be the exchange of digital information. For example, the user can send a command to the target device, e.g. set a target temperature of an air conditioning system. It is also possible for the user to make settings on a target device, for example, that an air conditioning system switches on at 8:00 a.m. from Monday to Friday. On the other hand, the target device can send measured values, such as the current temperature, status information, such as whether it is currently active, or even acknowledgements of commands to the terminal device. All this communication is also known as the "Internet of Things" or, shortly, IoT.

The target devices can be, for example, air conditioners, weather stations, surveillance cameras, cars, heating controls, refrigerators, control units for roller shutters, processing machines, access systems or so-called wearables. Thus, the target devices can be components of so-called Smart Home, Connected Car or general Internet of Things applications. In principle, all electrical, electronic or photonic devices are conceivable as target devices if they have a possibility to log onto a network.

In one embodiment of the invention, the universal communication platform checks whether the target device is allowed to log onto the mentioned network and sends the mentioned log-on credentials message to the user's terminal device only in case of a positive test result. This ensures that no "unwanted" target devices log onto the network and, in particular, that only users who are authorized to do so log on a target device.

The universal communication platform checks, for example, whether the target device has already been logged onto a network by another user. If this is the case and this user has not released the target device via a suitable release message, then the target device must not log onto the network. In this case, the universal communication platform sends a corresponding message to the user. It is also possible that the universal communication platform contains a list of all target devices that are allowed to log onto a network and/or to a special network. In this case, the universal communication platform checks after receiving a logon message whether the corresponding target device is included in the aforementioned list. If this is the case, the mentioned log-on credentials message is generated and sent to the user. If this is not the case, a message that the target device is not allowed to log on to the network is sent to the user.

In another embodiment of the invention, the universal communication platform exchanges information with at least one specific communication platform for the aforementioned test whether the target device is allowed to log on to the aforementioned network. Thus, the examination can be performed very flexibly.

A specific communication platform is understood here to be a communication platform for a given selection of target devices. For example, a specific communication platform may be intended for target devices of a certain manufacturer. In order to use such a specific communication platform, a special program is usually required on the user's terminal device. The information is then transmitted between target device and terminal device in a special protocol supported by the program used. The protocols used for different specific communication platforms differ greatly. A user who wants to exchange information with target devices from different manufacturers must therefore use different terminal devices and/or different programs with different protocols. Communication with target devices from different manufacturers can be greatly simplified if the user communicates with his terminal device using a universal communication platform, which then forwards the information to the corresponding specific communication platform using the appropriate protocol. Such procedures are described in DE 102016014479 A1, for example.

In the present embodiment of the invention, for example, lists of target devices are stored in one or more specific communication platforms, which are allowed to log onto a network. As soon as the universal communication platform receives a log-on message, it asks at least one specific communication platform whether the corresponding target device is allowed to log onto the network. If the response is positive, it generates the log-on credentials message and sends it to the user; if the response is negative, it sends a corresponding message to the user.

In a suitable embodiment of the invention, the universal communication platform can receive electronic application messages via more than one receiving address, whereby in particular each receiving address is assigned to a specific communication platform. Thus, the universal communication platform can very easily determine which specific communication platform must be contacted for the examination of the eligibility for a log-on authorization.

As mentioned above, a specific communication platform is assigned in particular to a manufacturer of target devices. Thus, each manufacturer working with the universal communication platform can offer its customers and thus users of the target devices their own receiving address. The logon messages sent to the different receiving addresses are all received by the universal communication platform and can be assigned to a specific communication platform and thus to a specific manufacturer via the receiving address. It is also possible that several receiving addresses are assigned to a specific communication platform or manufacturer or that a receiving address is assigned to several specific communication platforms or manufacturers.

In a suitable embodiment of the invention, the target device sends a log-on confirmation to the universal communication platform and/or the specific communication platform after successful login to the network, and after receiving the log-on confirmation, the target device is assigned to the user. This makes it easy to ensure that only the authorized user can communicate with the target device.

When using communication between terminal device and target device via a universal or a specific communication platform, it is not desired that any user can send an electronic message, for example in the form of a command, to any target device. However, it would be very cumbersome if a user had to authorize himself or herself, for example by entering a user ID and password, before or each time when an electronic message is sent to a target device. The described assignment of the target device to the user prevents unauthorized access to the target device by other users.

The target device sends the log-on confirmation in particular via the network on which it has logged on to the universal communication platform and/or the specific communication platform. The user is identified in particular by his user contact address from which he sent the registration message to the universal communication platform. For this purpose, the universal or a specific communication platform contains in particular a list of all authorized users with their various user contact addresses.

A user contact address is to be understood here quite generally as an identifier that allows an electronic message to be addressed and sent to the user via a communication channel. A user contact address can be, for example, a mobile phone number for addressing an SMS or WhatsApp® message, a Facebook® or Twitter® identifier or an e-mail address. Other user contact addresses are also conceivable. It should only be ensured that when sending an electronic message, the sender of the message can be identified via the specified user contact address.

In this context, the assignment of a target device to a user shall mean that the target device is linked to the user in such a way that the user can communicate with the target device, in particular via a terminal device, and thus exchange information without having to re-authorize each time information is exchanged.

In particular, it is possible that a user to whom the target device is assigned may give another user access to a specific target device only for a certain period of time. For example, if the other user is a guest in a hotel, he can be given access only to a target device in his hotel room and only for the duration of his stay. At the end of the stay, the access authorization automatically expires without any further action being required.

In order to be able to change the assignment of a target device, the user can especially unassign a target device assigned to him.

This invention can be embodied so that the light-sensitive sensor of the target device is automatically deactivated after successful login to the network. This prevents misuse of the light-sensitive sensor, for example unauthorized reception of information sent via modulated light by an unauthorized user. The user to whom the target device is assigned can reactivate the light-sensitive sensor by sending a corresponding instruction to the target device. In particular, the target device may have an additional option to activate or deactivate the light-sensitive sensor, e.g., a switch.

In an embodiment of the invention, the target device generates an error log file in case of unsuccessful logins to the network and outputs this file. The error log file can, for example, be output via an LED in the form of modulated light. It is also possible that the error log file is executed as an audio file and output via a loudspeaker built into the target device or connected via a cable. The error log file is received by a user's terminal device via a light-sensitive sensor or microphone and sent to the universal communication platform. For sending, either the same receiver address as for the log-on message or a special receiver address for error log files can be used. The universal communication platform evaluates the error log file and sends a corresponding response back to the user. The universal communication platform can also send information about the error to the manufacturer of the target device, who can evaluate it. In particular, the feedback contains information on how a successful login to the network can be performed.

With this design of the invention, the user can also receive assistance for target devices without display options, such as a display for logging onto a network.

The universal communication platform first extracts the contents of the error log file, i.e. the error message of the target device. For the generation of the feedback, in particular, a table with error messages and associated feedback messages is stored in the universal communication platform. The feedback to the user can, for example, consist of a text message, an audio file or a link to a website with further information.

In one embodiment of the invention, the universal communication platform for the generation of the mentioned feedback exchanges information with at least one specific communication platform. Thus, the feedback to the user can be generated very flexibly.

In one embodiment of the invention, the universal communication platform converts the error log file into an error protocol and sends the error protocol to at least one specific communication platform. Thus, only the universal communication platform and none of the specific communication platforms must have the possibility to extract information from an error log file.

An error protocol is here understood to be a machine-readable protocol, for example in ACSII format, which the specific communication platform can easily evaluate. The universal communication platform may generate only one type of error log or, in particular, one type of error log adapted to the corresponding specific communication platform.

BRIEF DESCRIPTION OF THE DRAWING

Further details of the invention can be found in the description and the drawing. Examples of the invention are shown in the sole FIGURE in simplified form and explained in more detail in the following description.

In this sense, the sole FIGURE shows a communication system by means of which a user can communicate with a target device.

DETAILED DESCRIPTION OF THE PARTICULAR EMBODIMENTS

The sole FIGURE shows a target device 11 that is to be logged on to a network 13 in the form of a password-protected WLAN network. The network 13 is managed by a router 15, which is also connected to the Internet. To log on to network 13, a correct password must be entered.

A user 17 knows this password, which can be described as a login option to network 13. To log the target device 11 onto network 13, user 17 sends an encrypted electronic log-on message (symbolized by the arrow 19) via a terminal device 18, for example in the form of a smartphone, to a universal communication platform 21. At least at this point in time, there is not yet any communication link between the terminal device 18 and the target device 11 existing. The universal communication platform 21 is a service that is executed on one or more servers on the Internet, i.e. in the so-called cloud. The user 17 sends a WhatsApp® message, for example, as a log-on message to a receiving address of the universal communication platform 21. The receiving address and additionally, a serial number of target device 11 are contained in written documents of target device 11. The receiving address and/or the serial number may also be contained in a QR code applied to the target device 11. The serial number can be considered as information about the identity of the target device 11. The logon message to the Universal Communications Platform 21 contains the serial number of the target device, the password for network 13 and a keyword that identifies the electronic message as a logon message.

For example, the electronic logon message may contain the following: "Logon Serial Number: 123 Password ABC", where "Logon" is the keyword specified, "123" is the serial number and "ABC" is the password. The universal communication platform 21 may also have one or more special receiving addresses that are only used for logon messages. In this case, it is not necessary to use a keyword.

The universal communication platform 21 first interprets the received log-on message. To do this, it searches the log-on message for specific keywords such as "Logon" or "Onboarding". If it detects one of these keywords, it extracts the above-mentioned information about the identity of the target device 11 and the possibility to log on to the network 13 by searching for keywords such as "serial number" or "password" and extracts the above-mentioned information from the log-on message. To interpret the log-on message, the universal communication platform 21 can also access a knowledge database 23 via the Internet.

It is also possible that the electronic log-on message does not contain the password and that the user is directed to a special, in particular secure, website where he/she can enter the password in response to the log-on message.

If the universal communication platform 21 has extracted the serial number of the target device 11 and the password to network 13, the universal communication platform 21 checks in particular whether the target device 11 is allowed to log on to said network 13. For this purpose, the universal communication platform 21 exchanges information with a specific communication platform 25. The universal communication platform 21 is also in communication connection with another specific communication platform 27. Since the user 17 has sent the registration message to the recipient address of the individual communication platform 21 assigned to the specific communication platform 25, the universal communication platform 21 knows that it must request the specific communication platform 25 in this example. In addition to the receiving address assigned to the specific communication platform 25, the universal communication platform 21 can also receive logon messages via another receiving address assigned to the specific communication platform 27.

The specific communication platform 25 is operated by the manufacturer of the target device 11. The specific communication platform 25 contains a table with all serial numbers of target devices that can log on to a network. In addition, the table also contains information on whether a target device is already assigned to a user and, if so, which user. The universal communication platform 21 sends the serial number of the target device to the specific communication platform 25. If the serial number of the target device 11 is contained in the above table and it has not yet been assigned to any other user, the specific communication platform 25 reports back to the universal communication platform that the target device 11 may log on to the network 13.

If the universal communication platform 21 receives a positive response from the specific communication platform 25, i.e. the target device 11 is allowed to log on to the network 13, the universal communication platform 21 generates a log-on credentials message and integrates the information about the identity of the target device in the form of the serial number of the target device 11 and the logon option to the network 13 in the form of the password into the log-on credentials message. The log-on credentials message can be generated either by the universal communication platform 21 itself or by an external service accessed via the Internet.

The universal communication platform 21 sends the aforementioned log-on credentials message in encrypted form to the terminal device 18 of user 17 (symbolized by arrow 29). The universal communication platform 21 uses the same communication channel, i.e. a WhatsApp® message, as the one used by user 17 to send the logon message.

The user 17 transmits the received log-on credentials message via a LED that is not shown of the terminal device 18 in the form of modulated light in such a way that the target device 11 can detect the replayed sounds, i.e. the content of the log-on credentials message via a built-in light-sensitive sensor 31 in the form of a photodiode (symbolized by arrow 32). The aforementioned LED of the terminal device 18 forms or is at least part of a flashlight device of the terminal device 18, which is otherwise used for better illumination when taking photographs or also as a flashlight. The target device 11 first extracts the contained serial number from the log-on credentials message. If the extracted serial number matches its own serial number, the target device 11 also extracts the password for the network 13, which is also contained in the message. The algorithms required for the extraction are programmed into the target device 11.

Finally, the target device 11 logs onto network 13 with the extracted password. The target device 11 is now logged on to network 13 and can send data or information and receive commands via the network 13. Since network 13 is also connected to the Internet, the target device 11 can also send information and receive commands via the Internet.

After successful login to network 13, the target device 11 sends a login confirmation to the universal communication platform 21. After receiving the login confirmation from the universal communication platform 21, the target device 11 is assigned to the user 17. It is also possible that the target device 11, after successful login to the network 13, first sends an electronic message to the specific communication platform 25 which then sends a login confirmation of the target device 11 to the universal communication platform 21.

After successful login of the target device 11 to network 13, the target device 11 automatically deactivates its light-sensitive sensor 31. The user 17 can reactivate the light-sensitive sensor 31 by sending a corresponding instruction to the target device 11 or via a switch, that is not illustrated, on the target device 11. It is also possible that the behavior of the light-sensitive sensor 31 can be parameterized by the user 17. It is not necessary to deactivate the light-sensitive sensor 31, the light-sensitive sensor 31 can also remain activated.

If the login of target device 11 to network 13 fails, the target device 11 creates an error log file in form of an error audio log file and outputs it via a built-in speaker 33. The error audio log file is received by the terminal device 18 of user 17 and sent to the universal communication platform 21. The universal communication platform 21 first extracts the contents of the error audio log file, i.e. the error message of the target device 11, and generates an error log from it, for example in the form of an ASCII file containing the error message of the target device 11. The universal communication platform 21 sends the error log file to the specific communication platform 25. A table is stored in the specific communication platform 25 in which each possible error message is assigned a suitable feedback to the user 17 in the form of instructions for error correction. The specific communication platform 25 sends the appropriate feedback to the universal communication platform 21, which then sends it in the form of an electronic message to the terminal device 18 of the user 17. Instead of outputting the error file via a loudspeaker, the target device can output the error log file also via an LED in the form of modulated light. In this case, the terminal device receives the error file with a light-sensitive sensor, for example a built-in camera. The universal communication platform 21 can also send the error log to the manufacturer of the target device 11 directly or via the specific communication platform 25. The manufacturer can then evaluate the error logs of various target devices and derive necessary improvements.

If the inquiry of the universal communication platform 21 to the specific communication platform 25 as to whether the target device 11 may log on to a network yields a negative result, i.e. if the target device 11 may not log on to the network 13, the universal communication platform 21 sends a corresponding electronic message to the terminal device 18 of user 17.

What is claimed is:

1. A method for logging a target device onto a network, comprising the steps of:
    transmitting an electronic log-on message from a terminal device (18) to a universal communication platform (21) by a user (17), wherein the log-on message contains information about the identity of the target device (11) and a log-on option to said network (13), and where at the time of transmission of the electronic log-on message there is not yet any communication link between the terminal device (18) and the target device (11) active;
    integrating the above-mentioned information of the log-on message into a log-on credentials message by the universal communication platform (21);
    transmitting the aforementioned log-on credentials message from the universal communication platform (21) to the user's (17) terminal device (18);
        transmitting the information contained in the log-on credentials message in the form of modulated light by the user's (17) terminal device (18);
        acquiring said information through a light-sensitive sensor (31) of the target device (11) and extracting the information about the option to log onto said network (13), and
        logging onto the network (13) using the above-mentioned log-on option through the target device (11).

2. The method according to claim 1, characterized in that the terminal device transmits the information contained in the log-on credentials message by means of a flashlight device.

3. The method according to claim 1, characterized in that the universal communication platform (21) checks whether the target device (11) is allowed to log onto the network (13) and sends the log-on credentials message to the user's terminal device (18) only if the check result is positive.

4. The method according to claim 3, characterized in that the universal communication platform (21) exchanges information with at least one specific communication platform (25, 27) for the check as to whether the target device (11) is allowed to log on to the network (13).

5. The method according to claim 4, characterized in that the universal communication platform (21) can receive electronic log-on messages via more than one receiving address, wherein a specific communication platform (25, 27) is assigned to each receiving address.

6. The method according to claim 4, characterized in that the target device (11) sends a log-on confirmation message to the universal communication platform (21) and/or the specific communication platform (25, 27) after successful login to the network (13) and the target device (11) is assigned to the user (17) after receiving the log-on confirmation.

7. The method according to claim 1, characterized in that the light-sensitive sensor (31) of the target device (11) is automatically deactivated after successful login to the network (13).

8. The method according to claim 1, characterized in that
    the target device (11) generates and outputs an error log file if the login to the network (13) is unsuccessful;
    the error log file is received by a terminal device (18) of the user (17) and sent to the universal communication platform (21); and
    the universal communication platform (21) evaluates the error file and sends a corresponding feedback to the user (17).

9. The method according to claim 8, characterized in that the universal communication platform (21) exchanges information with at least one specific communication platform (25, 27) for generating said feedback.

10. The method according to claim 9, characterized in that the universal communication platform (21) converts the error log file into an error log and sends the error log to the at least one specific communication platform (25, 27).

* * * * *